(12) United States Patent
Weichelt et al.

(10) Patent No.: US 9,625,632 B2
(45) Date of Patent: Apr. 18, 2017

(54) CAMERA, OPTICAL SYSTEM AND INTERCHANGEABLE LENS WITH BIREFRINGENT DEVICE

(71) Applicant: Sony Corporation, Tokyo (JP)

(72) Inventors: Christin Weichelt, Ostfildern (DE); Markus Kamm, Karlsruhe (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/075,561

(22) Filed: Mar. 21, 2016

(65) Prior Publication Data

US 2016/0291230 A1    Oct. 6, 2016

(30) Foreign Application Priority Data

Mar. 31, 2015   (EP) .................................... 15000940

(51) Int. Cl.
| | |
|---|---|
| *G02B 5/30* | (2006.01) |
| *G02F 1/13* | (2006.01) |
| *G03B 11/00* | (2006.01) |
| *H04N 5/225* | (2006.01) |
| *G02B 3/00* | (2006.01) |
| *G02B 27/09* | (2006.01) |

(52) U.S. Cl.
CPC ......... *G02B 5/3083* (2013.01); *G02B 3/0087* (2013.01); *G02B 27/0988* (2013.01); *G02F 1/1313* (2013.01); *G03B 11/00* (2013.01); *H04N 5/225* (2013.01)

(58) Field of Classification Search
None
See application file for complete search history.

(56) References Cited

U.S. PATENT DOCUMENTS

| | | | | |
|---|---|---|---|---|
| 3,397,023 A | * | 8/1968 | Land ........................ | G02B 5/23 250/226 |
| 4,591,253 A | * | 5/1986 | Hecker .................. | G02B 5/005 396/457 |
| 5,491,527 A | * | 2/1996 | Oshikiri ................. | G03B 17/24 359/676 |
| 5,847,872 A | * | 12/1998 | Ito ............................. | G01J 4/00 356/365 |
| 6,327,085 B1 | * | 12/2001 | Osawa ................. | G02B 5/3083 348/342 |
| 7,777,932 B2 | | 8/2010 | Zalevsky et al. | |
| 8,004,776 B2 | * | 8/2011 | Aruga ................ | G02B 27/0075 359/738 |

(Continued)

OTHER PUBLICATIONS

Gary W. Euliss et al. "Information-theoretic analyses of a birefringent blur filter", Applied Optics, vol. 40, No. 35, 2001, 13 pages.

(Continued)

*Primary Examiner* — William Perkey
(74) *Attorney, Agent, or Firm* — Oblon, McClelland, Maier & Neustadt, L.L.P.

(57) ABSTRACT

An optical system (110) includes a lens unit (112) with a plurality of lenses. An out-of-focus point spread function of the lens unit (112) includes an annular intensity distribution with at least one ring-shaped side peak at a radial distance to a center point. A birefringent device (115) in an optical path of the optical system (110) is adapted to selectively attenuate the ring-shaped side peak in the out-of-focus point spread function of the lens unit (112).

18 Claims, 11 Drawing Sheets

(56) References Cited

U.S. PATENT DOCUMENTS

| | | | | |
|---|---|---|---|---|
| 8,442,397 B2* | 5/2013 | Kang | ................... | G02B 3/0006 |
| | | | | 396/268 |
| 8,687,040 B2 | 4/2014 | Silveira | | |
| 8,885,086 B2* | 11/2014 | Wang | ................... | G02B 5/3083 |
| | | | | 348/335 |
| 2015/0163387 A1* | 6/2015 | Lee | ................... | H04N 5/238 |
| | | | | 349/2 |
| 2016/0291230 A1* | 10/2016 | Weichelt | ................ | G02B 5/3083 |
| 2016/0291343 A1* | 10/2016 | Prasad | ................... | G02B 27/58 |

OTHER PUBLICATIONS

Zou Li Min et al. "Improvement of Lateral Resolution Property of Differential Confocal System using Radial Birefringent Pupil Filter", Proc. of SPIE, vol. 7133, 2009, 11 pages.

Jiming Wang et al. "Superresolution, extended focal depth or focal shift with electrically controllable radial birefringent filter", Journal of Optics A: Pure and Applied Optics, 2005, 7 pages.

\* cited by examiner

CAMERA, OPTICAL SYSTEM AND INTERCHANGEABLE LENS WITH BIREFRINGENT DEVICE

BACKGROUND

Field of the Disclosure

The present disclosure relates to a camera, an optical system and an interchangeable lens including a birefringent device, respectively. The disclosure further relates to a method of manufacturing an optical system.

Description of Related Art

When taking an image with a lens that limits the depth of focus, out-of-focus portions of the image appear unsharp or blurred. The subjective quality of how the out-of-focus portions appear to a viewer contributes to the overall image quality. The way the lens renders out-of-focus points of light is described by the term "bokeh". For example, out-of-focus light points imaged into spots, in which brightness gradually and smoothly decreases with increasing distance to a centre point, result in smoothly blurred out-of-focus portions and a pleasant bokeh. Out-of-focus light points which the lens images into blurred spots in which brightness abruptly decreases or increases at a certain distance to the center point may result in hard edges within the blurred image portions or in rings which the viewer typically perceives as less pleasant, respectively. Determining factors for the type of bokeh are amount and sign of the optical aberrations present in the optical system.

There is a need for optical systems and cameras with pleasant bokeh. The object of the present embodiments is achieved by the subject-matter of the independent claims. The dependent claims define further embodiments.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

According to an embodiment, an optical system includes a lens unit with a plurality of lenses. An out-of-focus point spread function of the lens unit includes an intensity distribution with a ring-shaped side peak at a radial distance to a center point. A birefringent device in an optical path of the optical system is adapted to selectively attenuate the ring-shaped side peak in the out-of-focus point spread function of the lens unit.

According to another embodiment, an interchangeable lens includes a lens unit with a plurality of lenses. An out-of-focus point spread function of the lens unit includes an intensity distribution with a ring-shaped side peak at a radial distance to a center point. A birefringent device in an optical path of the interchangeable lens is adapted to selectively attenuate the ring-shaped side peak in the out-of-focus point spread function of the lens.

According to a further embodiment, a camera includes a lens unit with a plurality of lenses. An out-of-focus point spread function of the lens unit includes an intensity distribution with a ring-shaped side peak at a radial distance to a center point. A birefringent device in an optical path of the lens unit is adapted to selectively attenuate the ring-shaped side peak in the out-of-focus point spread function of the lens unit.

A further embodiment concerns a method of manufacturing an optical system. The method includes determining an out-of-focus point spread function of a lens unit that includes a plurality of lenses. The method further includes determining, by using a numerical optimization method, a polarization dependent phase alteration for the pupil function. The phase alteration attenuates a ring-shaped side peak in the out-of-focus point spread function of the lens unit by at least 25 percent. The numerical optimization method varies two complex conjugate phase alterations in combination with the pupil function of the lens unit for minimizing the side peaks at minimum effect on an in-focus point spread function of the lens unit.

BRIEF DESCRIPTION OF THE DRAWINGS

In the following drawings, like reference numerals designate identical or corresponding parts throughout the several views. The elements of the drawings are not necessarily to scale relative to each other. Features of any of the illustrated embodiments can be combined with one or more of the other illustrated embodiments to form further embodiments.

DESCRIPTION OF THE EMBODIMENTS

Figure 1A:
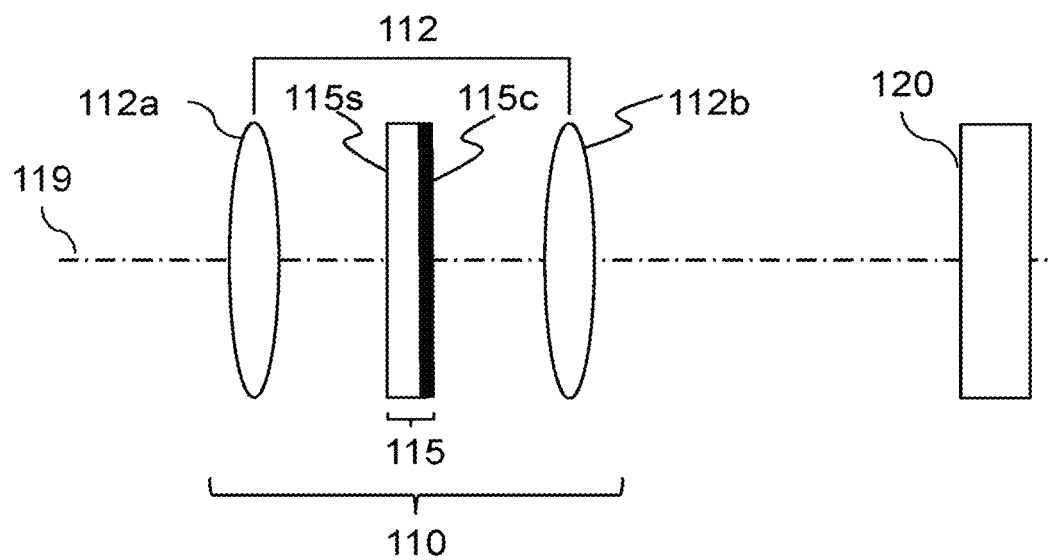
FIG. 1A is a schematic block diagram of an optical system with a birefringent device arranged between a first portion of a lens unit and an image capture unit.

FIGS. 1A to 1D refer to an optical system 110 of an optical imaging device, for example a camera for consumer, industrial, surveillance or medical applications or an apparatus including a camera function, for example, a cellular phone or a PDA (personal digital assistant), by way of example. According to an embodiment, the optical system 110 is an interchangeable lens for a professional camera, for example a prime lens or a zoom lens.

The optical system 110 may include a lens unit 112 that images an object onto an image capture unit 120 arranged in the image plane of the lens unit 112. The lens unit 112 may include a plurality of focusing and defocusing single lenses and optical surfaces, lenses for correcting lens aberrations of the focusing and defocusing lenses as well as optical filters. A front diameter of the lens unit 112 may be a diameter typical for mobile phones cameras, e.g., less than 10 mm. According to an embodiment, a front diameter of the lens unit 112 may be greater than 40 mm. The lens unit 112 has an out-of-focus PSF (point spread function) with an intensity distribution that includes at least one ring-shaped side peak at a radial distance to a center point of the out-of-focus point spread function. A side peak intensity value of the at least one ring-shaped side peak exceeds a local minimum value between the ring-shaped side peak and the center peak by at least 50%, e.g., at least 100%.

The image capture unit 120 may include an electronic pixel sensor converting light into electric signals. According to other embodiments, the image capture unit 120 includes a light sensitive film and a film drive controlling a transport of the light sensitive film out of and back into a sprocket.

The optical system 110 further includes a birefringent device 115 arranged in an optical path of the optical system 110, e.g., in front of the first lens surface or between at least a first portion 112a of the lens unit 112 and the image capture unit 120. A second portion 112b of the lens unit 112 may be arranged between the birefringent device 115 and the image capture unit 120. The birefringent device 115 is mountable in the optical path of the optical system 110 and may include fixing and adjustment means at or near the periphery. An effective area of the birefringent device 115 may be in the aperture (pupil) of the optical system 110, wherein a center point of the birefringent device 115 is arranged at an optical axis 119 of the optical system 110. For example, the birefringent device 115 may be arranged close to the pupil plane of the optical system 110 or close to or at an aperture stop of the lens unit 112. The birefringent device 115 may be spatially separated from further single lenses of the optical system 110 of FIG. 1A or may directly adjoin a single lens. The effective area of the birefringent device 115 affects the light guided through the optical system 110 from an entrance at a side oriented to the imaged scene to the image capture unit 120. The birefringent device 115 may include a birefringent layer coated on a substrate, wherein the birefringent layer may be divided into several annular zones. The orientation of the extraordinary axis (e.g. fast axis in negative uniaxial crystals) of the birefringent layer may be homogeneous within each annular zone but may be different between the annular zones.

A phase function of the birefringent device 115 selectively attenuates the ring-shaped side peak in the intensity distribution of the out-of-focus PSF of the lens unit 112 by at least 25%, e.g., more than 50% such that a total out-of-focus PSF of the optical system 110 including the lens unit 112 and the birefringent device 115 has no or less pronounced ring-shaped side peaks compared to the out-of-focus PSF of the lens unit 112 alone. An out-of-focus light point is imaged into a light spot which brightness in substance gradually decreases with increasing distance to the center point, hence without perceivable ring component. At the same time, the birefringent device 115 effects only to a low, nearly non-perceivable degree the in-focus PSF and the MTF (modulation transfer function) of the optical system 100 such that the birefringent device 115 facilitates a pleasant bokeh without additional correction lenses and without or with only low adverse impact on the in-focus characteristics.

Typically, in professional cameras an apodization mask or additional correction lenses shape the blur of out-of-focus image portions to obtain a more pleasant bokeh. Additional lenses result in heavier, longer and more expensive objectives. An apodization mask absorbs light and may complicate autofocus mechanisms. Instead, the birefringent device 115 achieves a similar effect without loss of light, without additional lenses, at fewer costs, at less weight as well as smaller dimensions and without adverse impact on autofocus systems.

The birefringent device 115 achieves a suitable pupil function of the optical system by affecting the two fundamental orthogonal polarization directions of non-polarized or polarized light differently. In other words, the birefringent device 115 realizes a first pupil function assigned to a first polarization direction and a second different pupil function assigned to a second polarization direction orthogonal to the first polarization direction, wherein the added phase profile to the first pupil function is a complex conjugate of the added phase profile of the second pupil function.

According to an embodiment, the birefringent material, the thickness of a birefringent layer, and/or other optical properties, for example the refractive indices for two orthogonal polarization states, may be varied as a function of a distance to the center point of the birefringent device 115 in order to achieve the two different pupil functions.

The birefringent device 115 and its phase function may be rotationally symmetric with respect to the center point such that a rotation by an angle of 360°/n, n=1, 2, 3 . . . , does not change the respective function. For example, both phase functions may be point-symmetric such that a rotation by an angle of 360°/(2n), n=1, 2, 3 . . . , does not change the respective function. According to an embodiment, both phase functions may be circularly symmetric and are functions of the distance from the center point only.

Figure 1B:
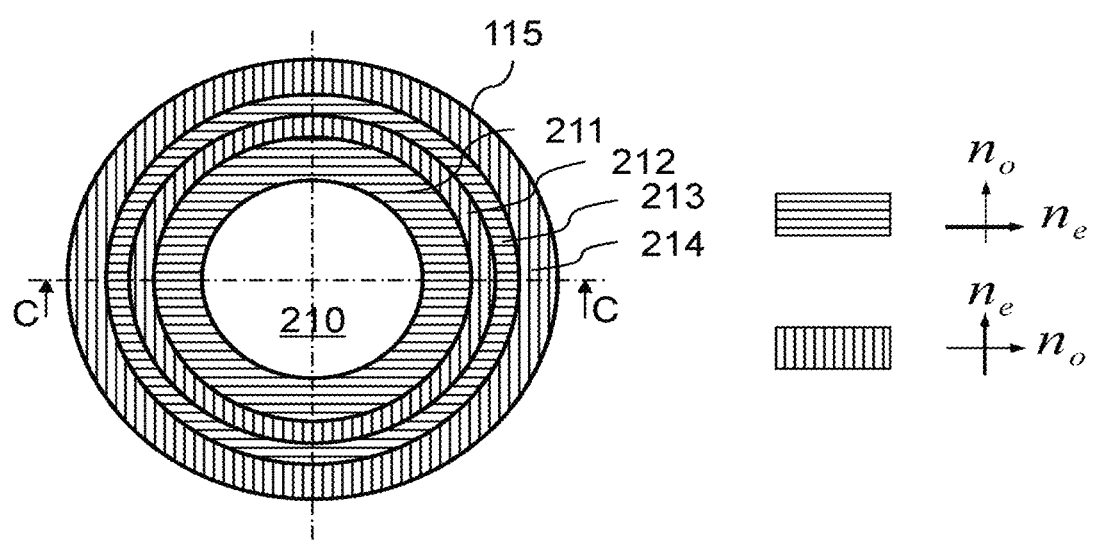
FIG. 1B is a schematic plan view of a birefringent device according to an embodiment.
Figure 1C:
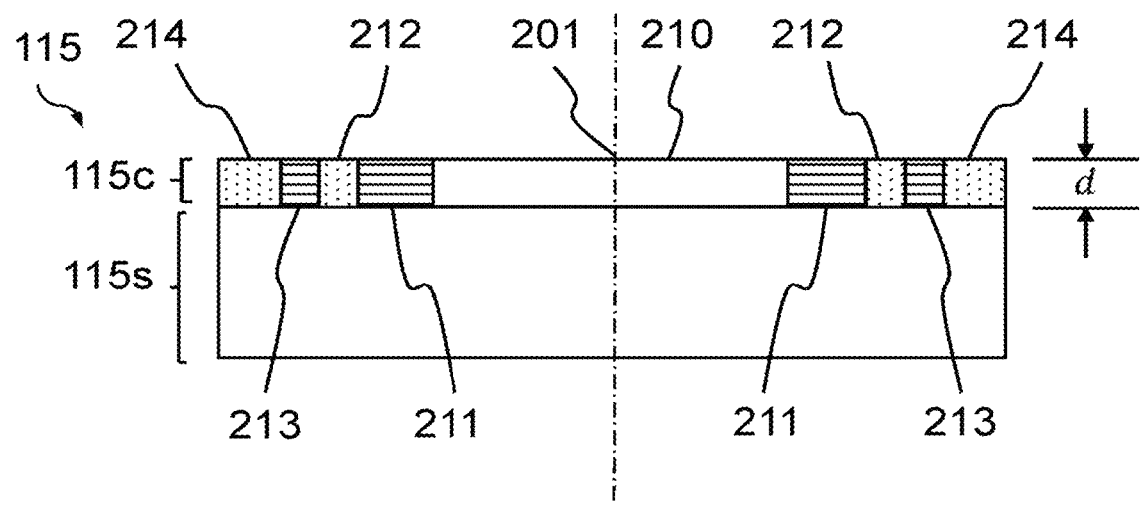
FIG. 1C is a schematic cross-sectional view of the birefringent device of FIG. 1B along line C-C.

FIGS. 1B and 1C refer to a birefringent device 115 with circularly symmetric structure, whereby the birefringent device 115 achieves different pupil functions for orthogonal polarization directions by varying the orientation of the fast axis of a birefringent material across the pupil plane. In a circularly symmetric birefringent device 115 an orientation of an ordinary axis and an orientation of an extraordinary axis of the birefringent material may change radially with respect to a center point on the optical axis of the optical system.

The birefringent device 115 may include a transparent, disc-shaped substrate 115s and a birefringent layer or coating 115c formed on at least one of two parallel principal surfaces of the substrate 115s. The coating 115c may include an inner circular zone 210 and a plurality of annular zones surrounding the circular zones 210. The number of circular zones may be greater than 10 or greater than 20, wherein the annular zones have different widths in a range from 50 µm to 2000 µm. For simplification, FIG. 1B shows only a first annular zone 211 directly adjoining the circular zone 210, a second annular zone 212 directly adjoining the first annular zone 211, a third annular zone 213 directly adjoining the second annular zone 212 and a fourth annular zone 214 directly adjoining the third annular zone 213.

The circular zone 210 and the annular zones 211-214 may include or consist of the same birefringent material. According to an embodiment, the circular zone 210 is formed from the same birefringent material as the annular zones 211-214, wherein in the circular zone 210, and the even numbered annular zones, e.g., the second annular zone 212 and the fourth annular zone 214, corresponding birefringent axes of the birefringent material are oriented parallel to each other. In the odd numbered annular zones, e.g., in the first and third annular zones 211, 213, the birefringent axes are rotated with respect to the corresponding birefringent axes in the circular zone 210. According to an embodiment, in the odd numbered annular zones, e.g., in the first and third annular zones 211, 213, the birefringent axes may be rotated by 90 degrees with respect to the corresponding birefringent axes in the circular zone 210 such that the orientations of the birefringent axes are interchanged with respect to the circular zone 210, the second annular zone 212 and the fourth annular zone 214.

According to another embodiment, the extraordinary axis (e.g. fast axis) orientation in the circular zone 210 may be tilted to the fast axis orientation in both the even and the odd annular zones. For example, the fast axis orientation in odd annular zones 211, 213 may be tilted by 90 degree and the fast axis orientation in the circular zone 210 may be tilted by 45 degree with respect to the fast axis orientation in the even annular zones 212, 214. Transitions between the annular zones and between the circular zone 210 and the first annular zone 211 may be gradual or stepped.

According to a further embodiment the birefringent coating 115c includes an opening corresponding to the circular zone 210, wherein the opening may be filled with transparent material, such that the circular zone 210 of the birefringent device 115 has no or only low effect on the PSF. Since the ring-shaped side peak is mainly caused by the wavefront shape in the outer region, e.g., the outer half of a lens system, the circular zone 210 also does not contribute to the attenuation or suppression of the ring-shaped side peak in the defocus PSF. When the lens is stopped down, e.g., the F-number is doubled, a birefringent device with a transparent central portion has no adverse impact on the in-focus MTF when a side-peak suppression in the PSF is not needed.

The birefringent device 115 may be a non-lensing device which does neither converge nor diverge light beams passing through the birefringent device 115. According to other embodiments, the birefringent device 115 may additionally correct aberrations caused elsewhere in the optical system 100, for example in the lens unit 112.

Figure 1D:
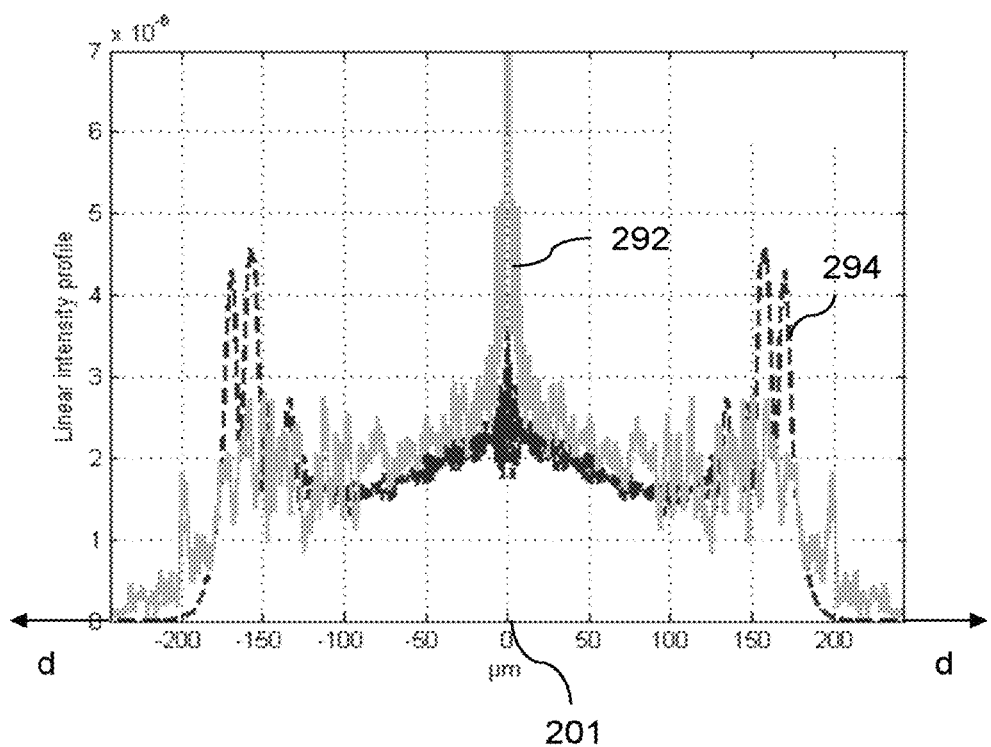
FIG. 1D is a diagram illustrating out-of-focus point spread functions of the optical system of FIG. 1A with and without the birefringent device of FIGS. 1B and 1C.

FIG. 1D shows the out-of-focus PSF 294 of the optical system 110 without birefringent device 115. The lens unit 112 is designed for a certain target in-focus PSF and for correcting chromatic and other aberrations at costs of an out-of-focus PSF with an intensity distribution including pronounced ring-shaped side peaks at a distance to the center point 201, wherein the peaks induce ring-shaped blur in the out-of-focus light points. The birefringent device 115 of FIGS. 1B and 1C can be designed such that in the resulting out-of-focus PSF 292 of the optical system 110 combining the lens unit 112 and the birefringent device 115, ring-shaped side peaks at a radius of approximately 130 µm, 155 µm and 170 µm are reduced by at least 25%, respectively. The remaining ring-shaped side peaks are significantly less pronounced.

Figure 1E:
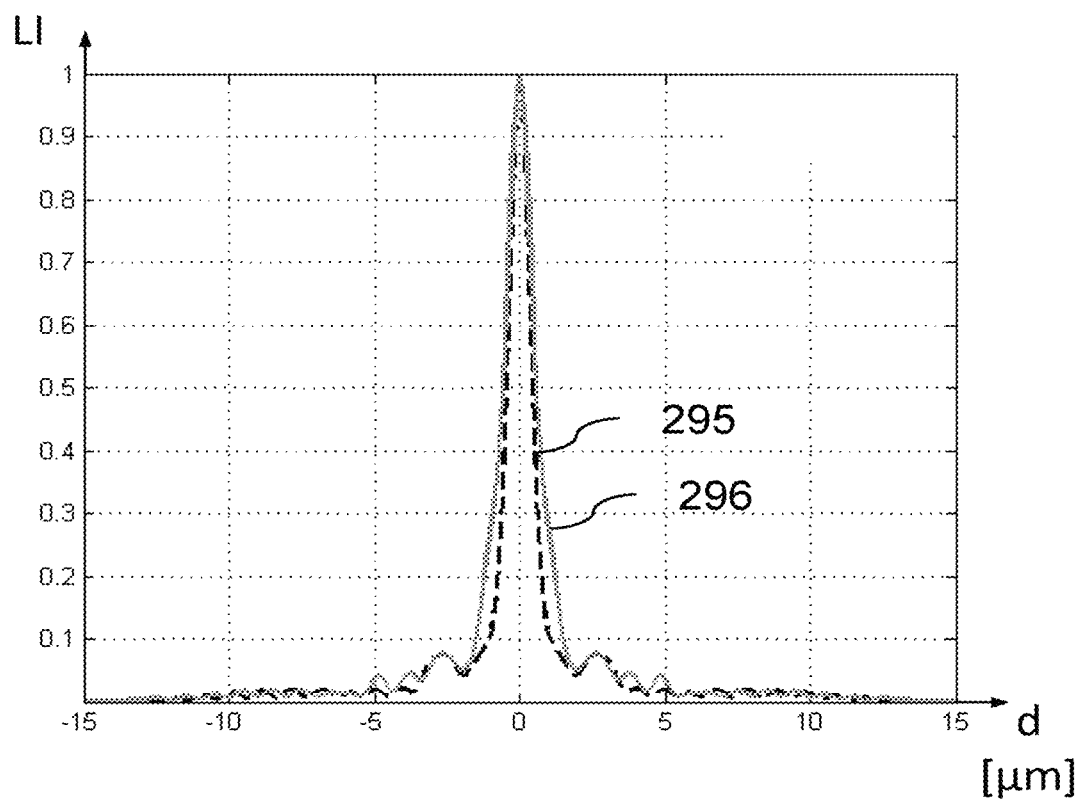
FIG. 1E is a diagram illustrating in-focus point spread functions of the optical system of FIG. 1A with and without the birefringent device of FIGS. 1B and 1C.

At the same time, the birefringent device 115 hardly affects the in-focus PSF and keeps the MTF of the optical system 110 high. According to an embodiment both the total in-focus PSF of the optical system 110 with the birefringent device 115 and the in-focus PSF of the optical system without birefringent device 115 approximate delta functions or Gaussian curves with a variance of $0.1 \, \mu m^2 < \sigma^2 < 0.35 \, \mu m^2$ FIG. 1E illustrates that the in-focus PSF 296 of the optical system 110 with birefringent device 115 approximates to a high degree the in-focus PSF 295 of the optical system 110 without birefringent device 115. As a consequence, the impact of the birefringent device 115 on the in-focus characteristics of the optical system 110 is low.

Figure 1F:
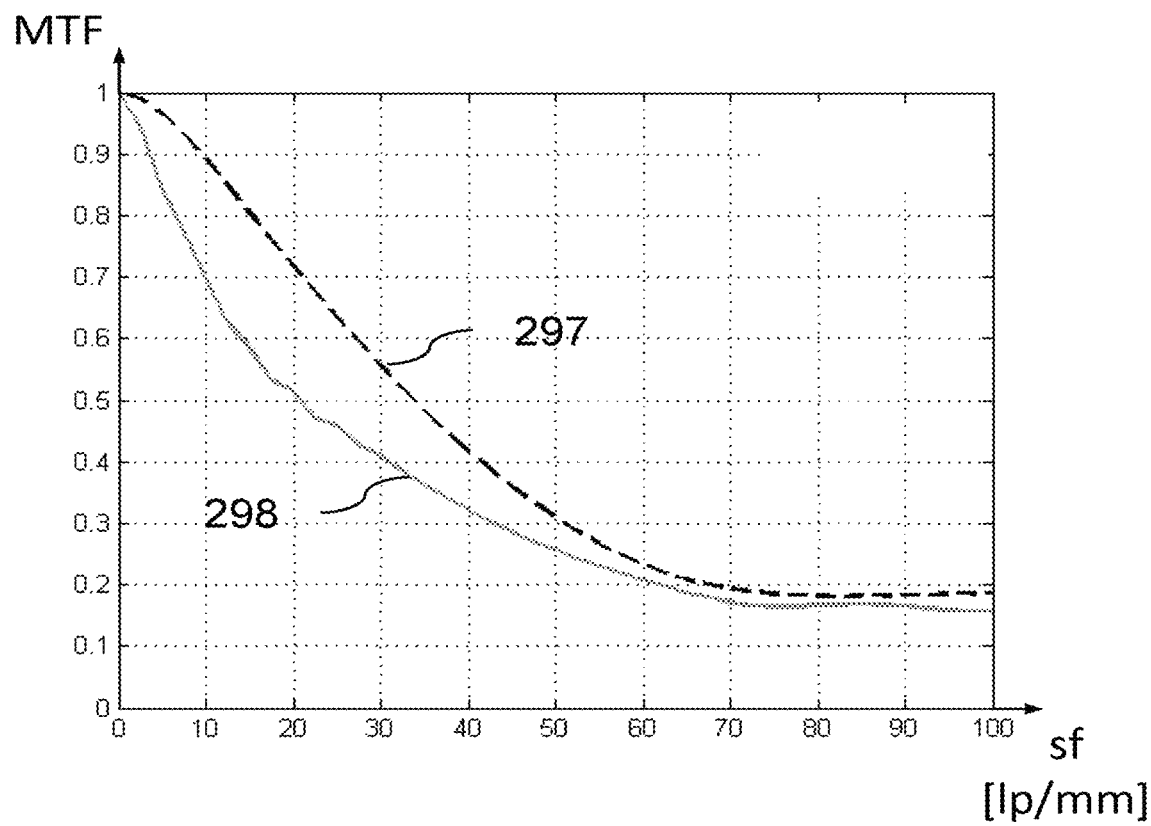
FIG. 1F is a diagram illustrating modulation transfer functions of the optical system of FIG. 1A with and without the birefringent device of FIGS. 1B and 1C.

FIG. 1F plots the in-focus MTF 298 of the optical system 110 including the birefringent device 115 as well as the in-focus MTF 297 of the optical system 110 without the birefringent device 115, wherein the modulation transfer is plotted against the spatial frequency in lp/mm, respectively. With the birefringent device 115 the MTF 298 drops by about 0.2 at low spatial frequencies below approximately 20 lp/mm, whereas at high spatial frequencies exceeding 60 lp/mm the birefringent device 115 has less impact on the MTF of the optical system 110.

According to other embodiments, further annular zones with the birefringent axes rotated by any angle between 0 degree and 90 degree with respect to the corresponding axes in the circular zone 210 may be formed between rings of orthogonal orientation of the birefringent axes.

Figure 2A:
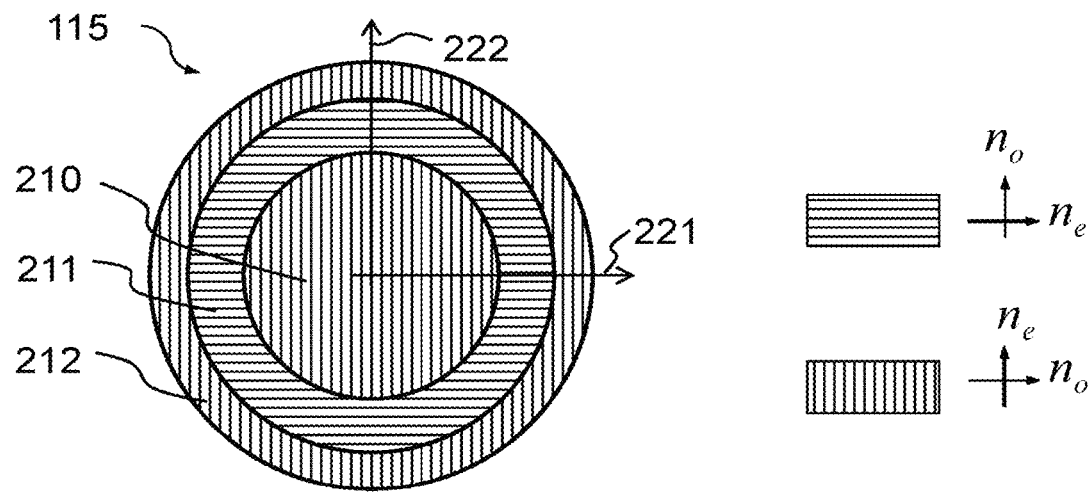
FIG. 2A is a schematic plan view of a further birefringent device according to a further embodiment.
Figure 2B:
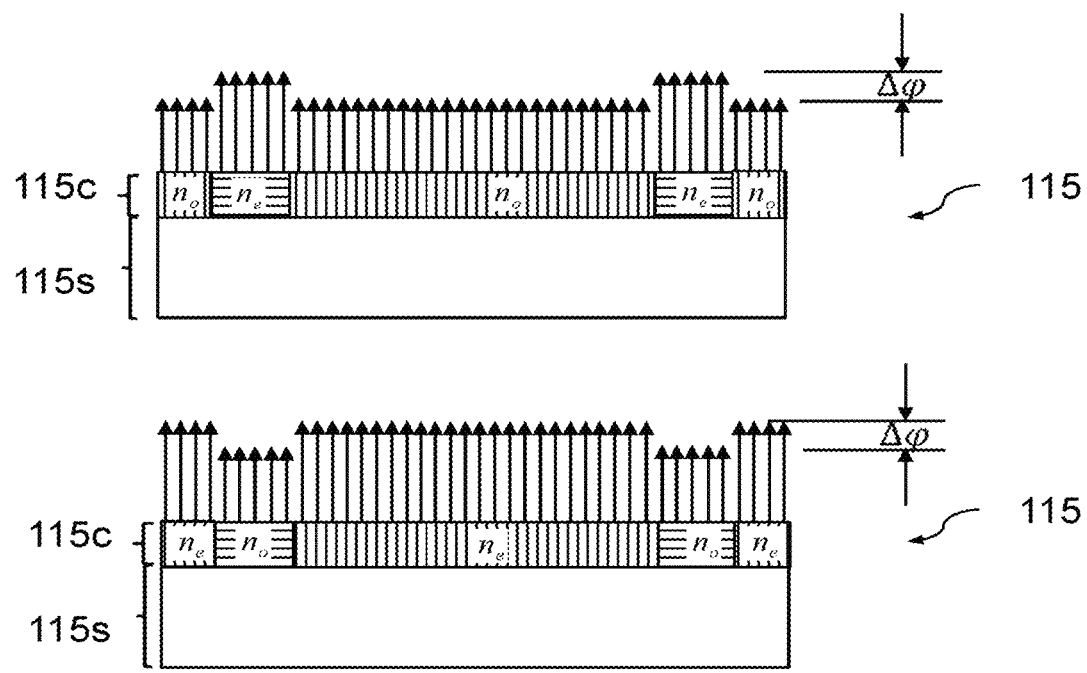
FIG. 2B schematically illustrates wavefront coding along two orthogonal axes of the birefringent device of FIG. 2A for discussing effects of the embodiments.

FIGS. 2A and 2B illustrate the way a birefringent device 115 achieves the desired effect on the out-of-focus PSF. FIG. 2A shows a birefringent device 115 with a first annular zone 211 in which the birefringent axes are rotated by 90 degrees with respect to the corresponding axes in an inner circular zone 210 and a second, outer annular zone 212. Arrow 221 represents the orientation which is parallel to the extraordinary axis $n_e$ of a first annular zone 211 in the birefringent device 115 and arrow 222 the orthogonal orientation which is parallel to the extraordinary axis $n_e$ of the annular zone 212 in the birefringent device 115.

As illustrated in the cross-sectional views of FIG. 2B the birefringent device 115 may include a transparent substrate 115s, e.g., a glass disk, and a coating 115c on at least one of two opposite principal surfaces of the substrate 115s. The coated surface of the substrate 115s may be planar.

The upper portion of FIG. 2B shows a wavefront of light, which is linearly polarized along axis 221 of FIG. 2A and the lower portion of FIG. 2B shows a wavefront of light, which is linearly polarized along axis 222. A phase difference Δϕ in rad between wavefront components passing through the circular zone 210 and the annular zones 211, 212 is equal to $2*\pi*d*(n_e-n_o)/\lambda$, with d representing the thickness of the birefringent coating 115c and λ representing the wavelength of the light. The birefringent device 115 manipulates the phase distributions for the ordinary and extraordinary beams such that the phase function of the birefringent device 115 attenuates ring-shaped side peaks in an intensity distribution of an out-of-focus PSF of a lens unit of an optical system. The added phase distribution for one state of polarization, e.g., the ordinary beam, is the complex conjugate of the added phase distribution for the other state of polarization, e.g., the extraordinary beam.

Figure 3A:
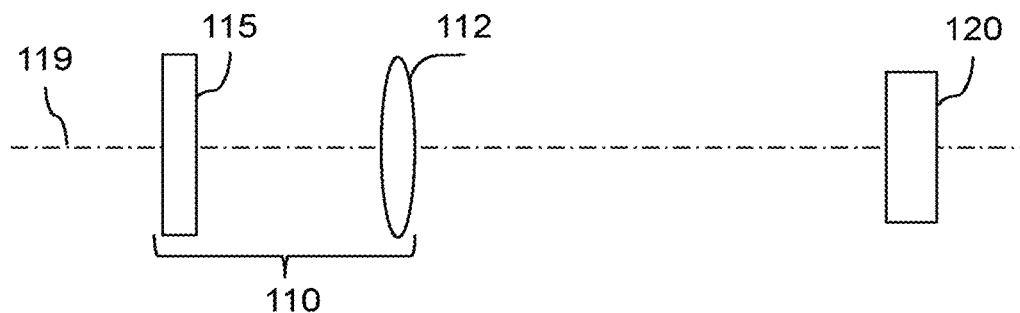
FIG. 3A is a schematic block diagram of an optical system according to an embodiment with a birefringent device arranged between an entrance of an optical system and a lens unit.
Figure 3B:
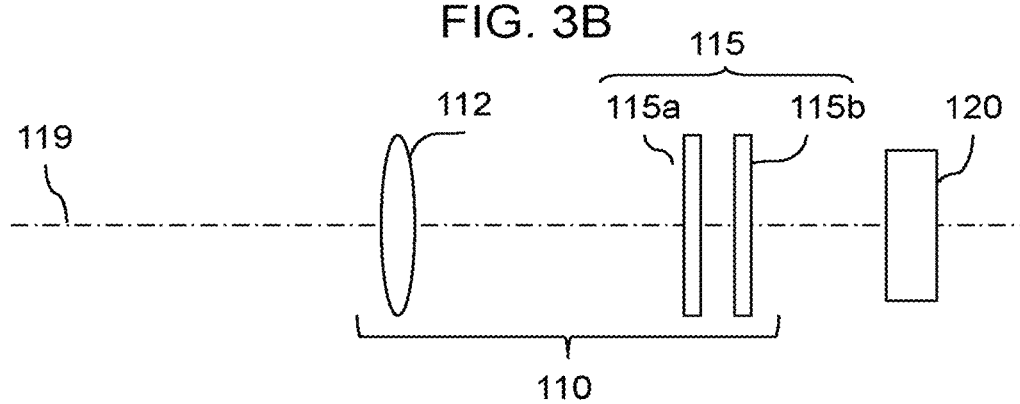
FIG. 3B is a schematic block diagram of an optical system with a two-piece birefringent device arranged between a first portion of a lens unit and an image capture unit.
Figure 3C:
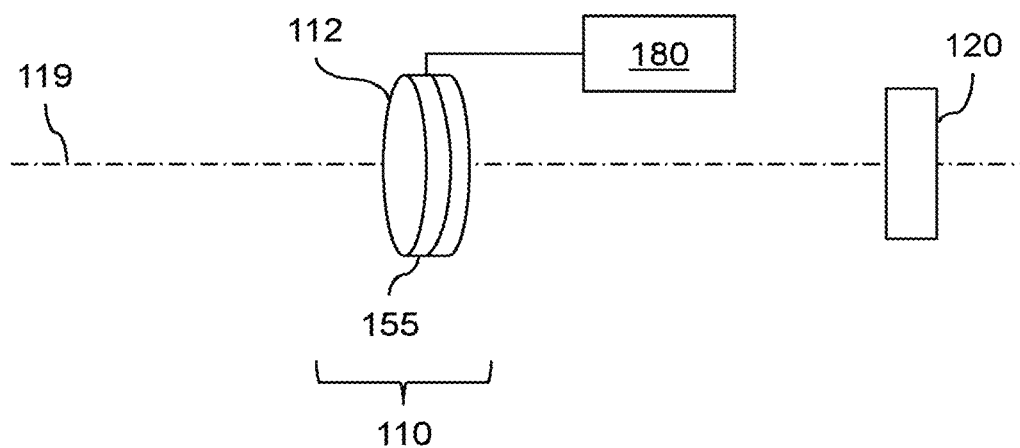
FIG. 3C is a schematic block diagram of an optical system according to an embodiment concerning a controllable birefringent device.

FIGS. 3A to 3C refer to arrangements of birefringent devices 115 within optical systems 110. In FIG. 3A, the birefringent device 115 is arranged between an entrance of the optical system 100 and the complete lens unit 112 focusing the incoming light that passes through the entrance on the image capture unit 120. An effective area of the birefringent device 115 is within the aperture of the optical system 100.

In FIG. 3B, the birefringent device 115 includes a plurality of spatially separated sub-devices realizing different pupil sub-functions, wherein the sum of the different sub-functions gives the first and second pupil functions. For example, a birefringent device 115 may be a two-piece device with a first sub device 115a realizing a first phase function and a second sub device 115b realizing a second phase function. The sub devices 115a, 115b may be arranged between the entrance of the optical device 100 and the image plane. According to the illustrated embodiment both sub devices 115a, 115b are arranged between the lens unit 112 and the image capture unit 120.

The birefringent device 115 may include one or more transparent substrates and one or more birefringent layers or coatings on the transparent substrates. The substrates may be or may include any transparent element arranged in the optical path of the optical system 100, for example one single lens, more than one single lens or one or more transparent disks with planar surface and without light converging or diverging properties. The target out-of-focus PSF may be realized by locally varying a polarization dependent refractive index, for example by varying the orientation of the extraordinary axis of a birefringent material or other physical and/or chemical properties of the coating across the effective area. In accordance with another embodiment, the coating may have a thickness gradient in conformity with the respective phase function of the birefringent device 115. Another embodiment may combine variation of thickness and refractive index variation to realize the intended out-of-focus PSF.

According to an embodiment, the coating may be a liquid crystal polymer aligned and fixed during manufacturing. For example, an alignment layer may align the liquid crystal polymer, wherein the orientation pattern of the alignment layer is fixed during a lithographic process, by irradiating the alignment layer under a photomask with linearly polarized UV radiation. The liquid crystal polymer finally is cured by irradiating it with UV radiation.

FIG. 3C refers to a birefringent device 115 including a liquid crystal layer 155 sandwiched between glass substrates. The orientation of the fast axis in the liquid crystal layer 155 may be controllable by a control unit 180 that switches the orientation of the liquid crystal molecules between two different directions to control the out-of-focus PSF and the behavior of blurred image portions.

Figure 4A:
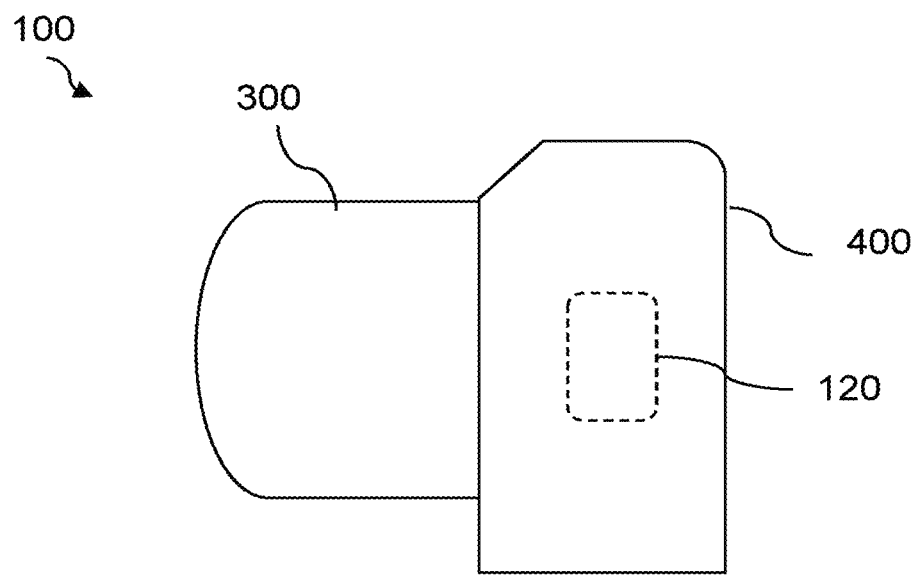
FIG. 4A is a schematic cross-sectional view of a camera with an interchangeable lens including a birefringent device according to another embodiment.

FIG. 4A shows an embodiment of a camera 100 with an interchangeable lens 300 including a portion of the optical system 110 of FIG. 1A. The camera 100 further includes an image capture unit 120 arranged in a housing 400.

Figure 4B:
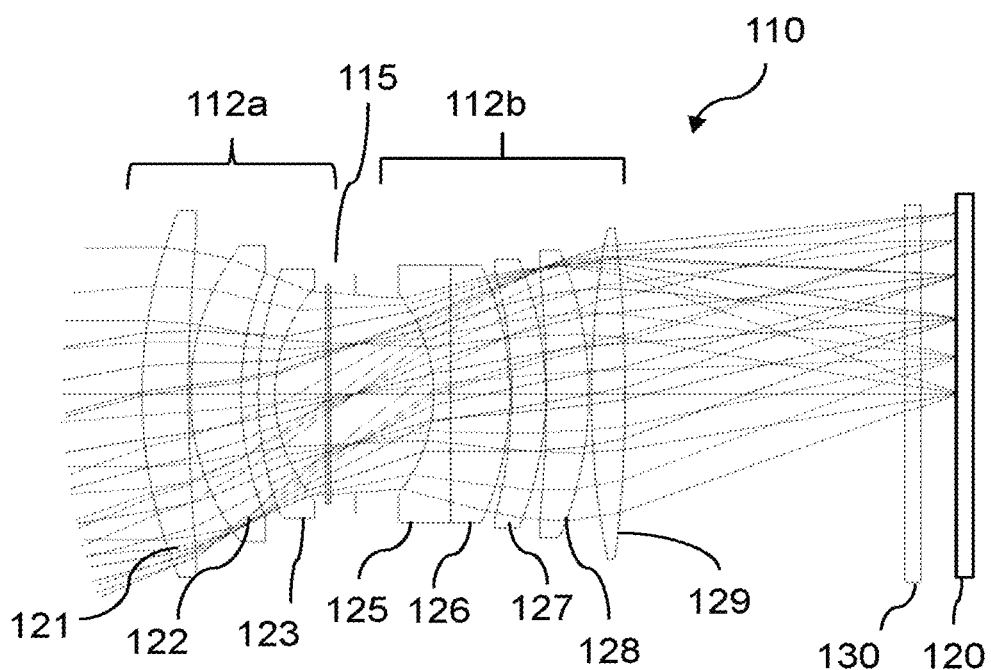
FIG. 4B is a schematic cross-sectional view of an optical system including the interchangeable lens of FIG. 4A.

FIG. 4B shows an embodiment of the interchangeable lens 300 in combination with the image capture unit 120 of the camera 100 of FIG. 4A. The interchangeable lens 300 may include a first lens portion 112a with three single lenses 121, 122, 123 arranged between the entrance opening of the interchangeable lens 300 and the birefringent device 115. A second lens portion 112b with five further single lenses 125, 126, 127, 128 and 129 is arranged between the birefringent device 115 and an exit opening of the interchangeable lens 300. The birefringent device 115 may be arranged close to an aperture stop of the interchangeable lens 300. The image capture unit 120 may include an electronic pixel sensor and a color filter matrix, which may be arranged in front of or which may be directly deposited on the image capture unit 120. A protection glass 130 may cover the image capture unit 120.

Other embodiments may use any combination of crystal axes or fast axis distortion, thickness variation and variation of optical properties. All these and further degrees of design freedom can be utilized in an optimization procedure that aims at achieving the specific optical properties of a pleasant bokeh. The optimization may be carried out by a simulation model and some optimization algorithms, for example particle swarm optimization or damped least squares. The simulation model runs on a processor or a computer, wherein from the desired properties of the optical imaging device an objective function is derived, that defines the target of the optimization process.

Figure 5A:
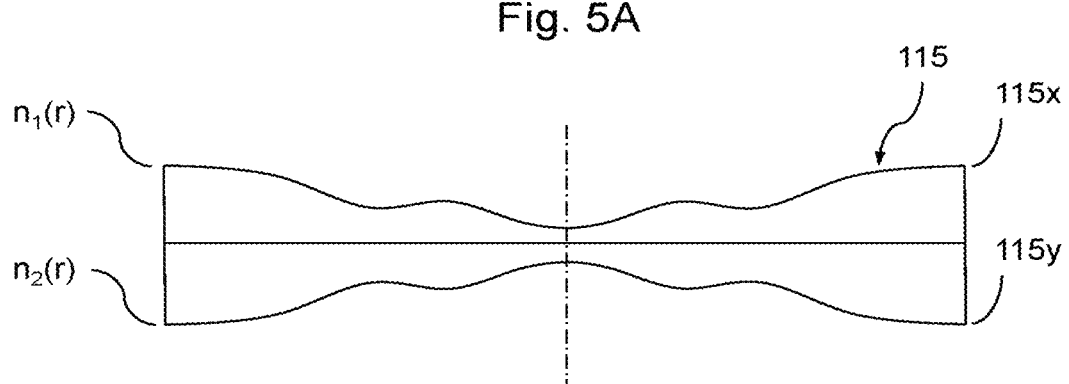
FIG. 5A is a schematic cross-sectional view of a two-piece birefringent device with two structures of homogeneous thickness according to an embodiment.
Figure 5B:
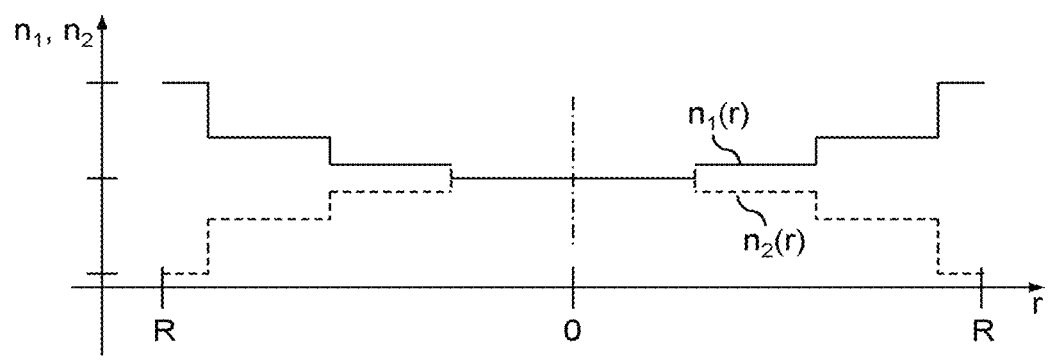
FIG. 5B is a schematic diagram showing refractive index gradients in the birefringent device of FIG. 5A.

For example, FIGS. 5A and 5B refer to a birefringent device 115 including a first structure 115x in which the refractive index effective for the first polarization state changes with increasing distance to a center point and with a second structure 115y in which the refractive index effective for the second polarization state changes with increasing distance to the center point. In accordance with the illustrated embodiment, the refractive indices n1(r), n2(r) may change in discrete or shallow steps between the center point and the radius R of the effective area of the birefringent device 115 in a circularly symmetric manner.

Figure 6A:
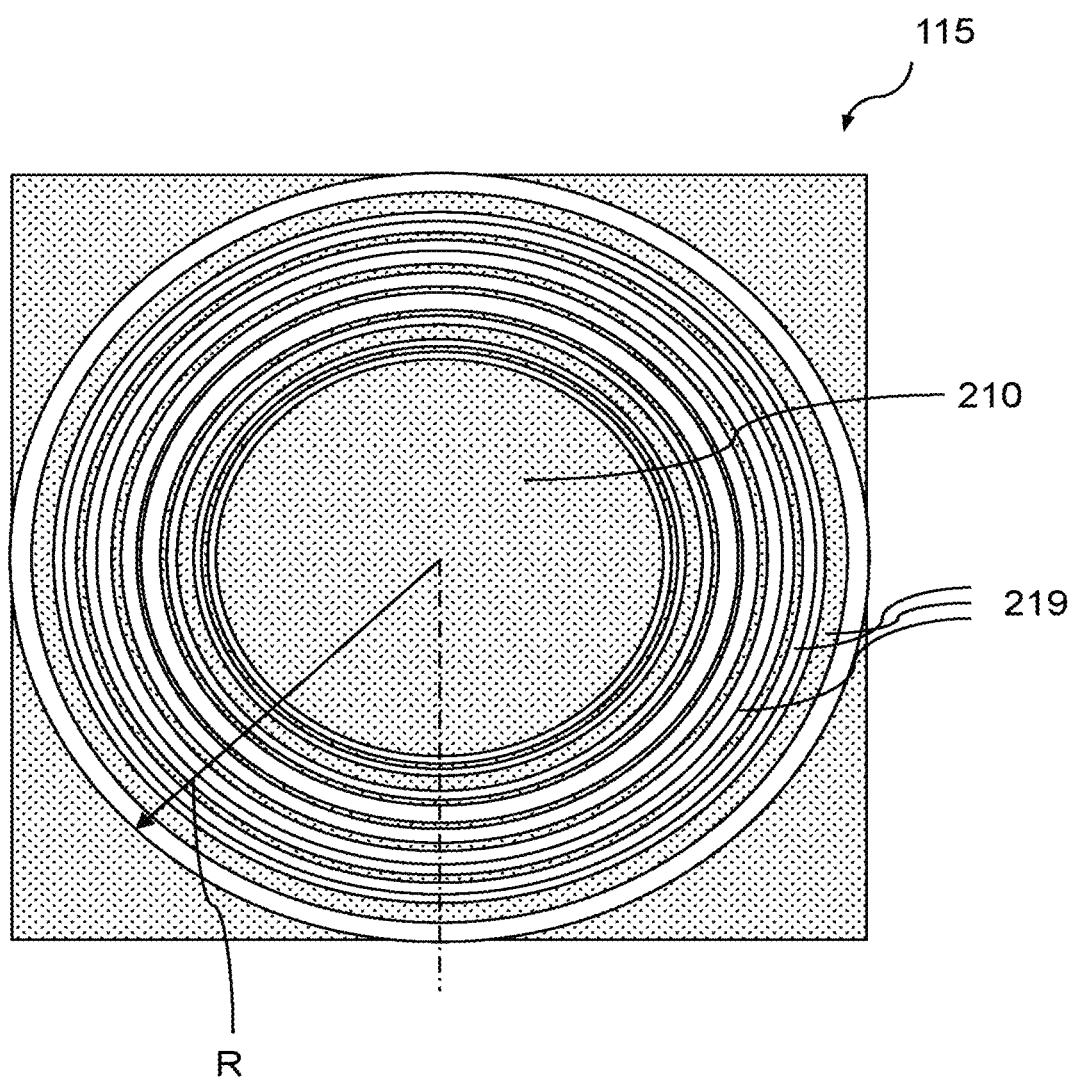
FIG. 6A is a schematic plan view of a birefringent device with a plurality of rings in an outer portion of an active area of a birefringent device according to another embodiment.
Figure 6B:
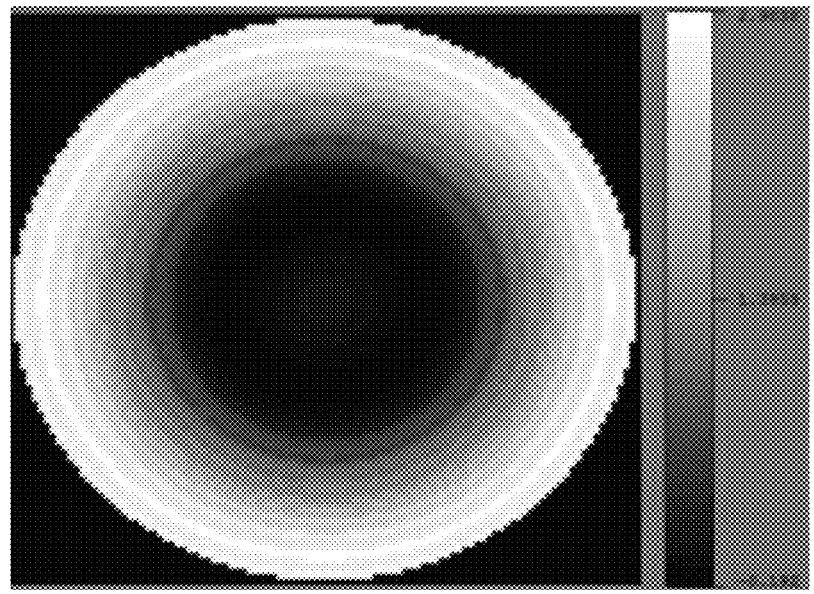
FIG. 6B is a schematic diagram illustrating wavefront aberrations of an optical system including the birefringent device of FIG. 6A for a first polarization direction for discussing effects of the embodiments.
Figure 6C:
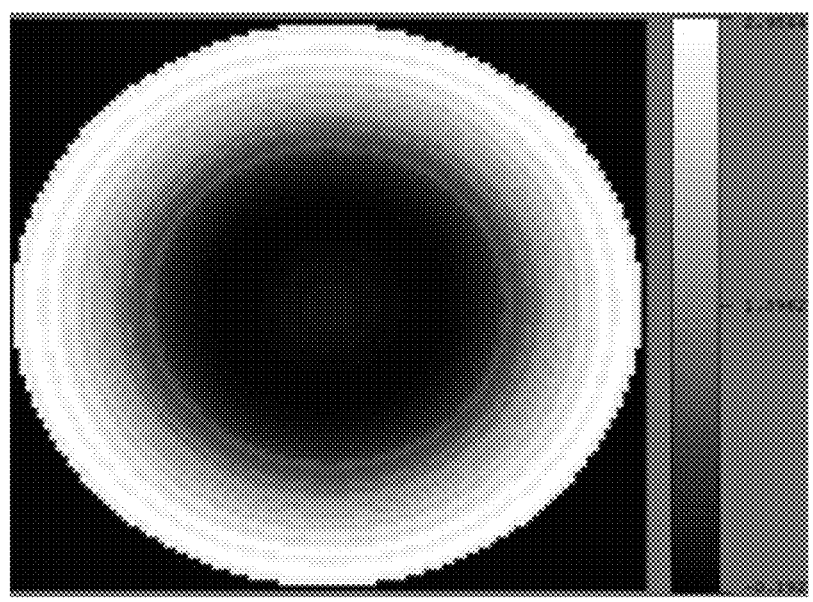
FIG. 6C is a schematic diagram illustrating wavefront aberrations of an optical system including the birefringent device of FIG. 6A for a second polarization direction orthogonal to the first polarization direction for discussing effects of the embodiments.

FIGS. 6A to 6C refer to a circularly symmetric birefringent device 115 which effective area is a circle with a radius R. The birefringent device 115 includes an inner circular portion 210 and a plurality of annular zones 219, wherein the radii of all annular zones 219 are greater than R/2. The birefringent material is aligned homogeneously within each annular zone 219.

According to an embodiment, the angle between the alignment directions of adjacent annular zones 219 may be any value from 0 degree to 180 degree. According to an embodiment, the angle between the alignment directions of adjacent annular zones 219 is 90 degree. The alignment direction of a uniaxial birefringent material is equivalent to the direction of the extraordinary axis of that material. Alteration of the ordinary and extraordinary axes in the outer annular zones 219 has mainly impact on an outer portion of the out-of-focus PSF, where typically the out-of-focus PSFs of lens units show an intensity distribution with ring-shaped side peaks.

FIG. 6B shows the wavefront for the horizontal polarization direction and FIG. 6C shows the wavefront for the vertical polarization direction for the birefringent device 115 in case of an angle of 90 degrees between the extraordinary axes of adjacent annular zones.

Figure 7A:
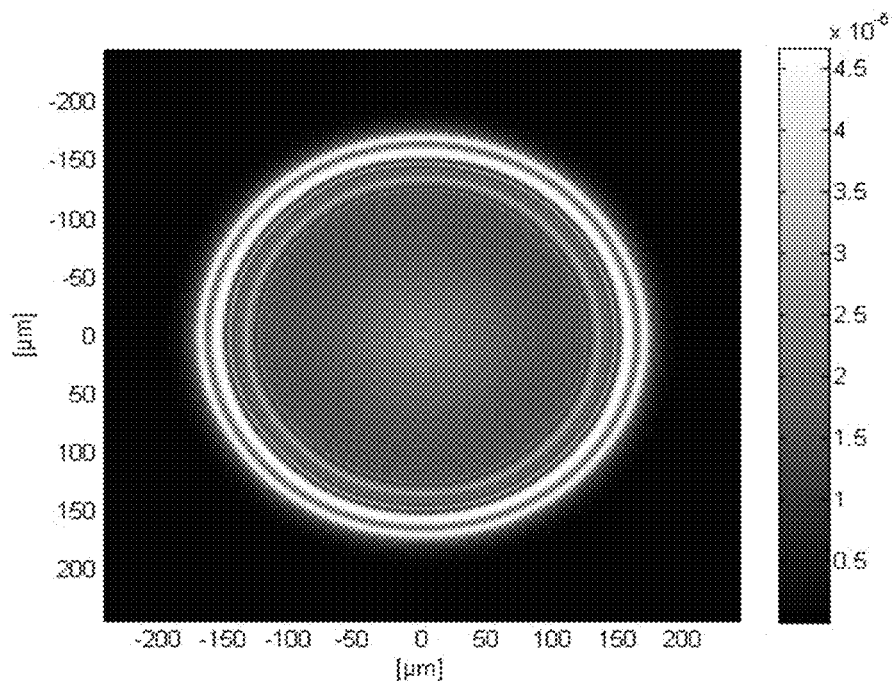
FIG. 7A is a schematic diagram illustrating the out-of-focus point spread function of the lens unit of FIG. 6A without birefringent device.

FIG. 7A shows the out-of-focus PSF of a lens unit without birefringent device 115. Sharp dark-to-bright steps may point to a ring-shaped out-of-focus blur.

Figure 7B:
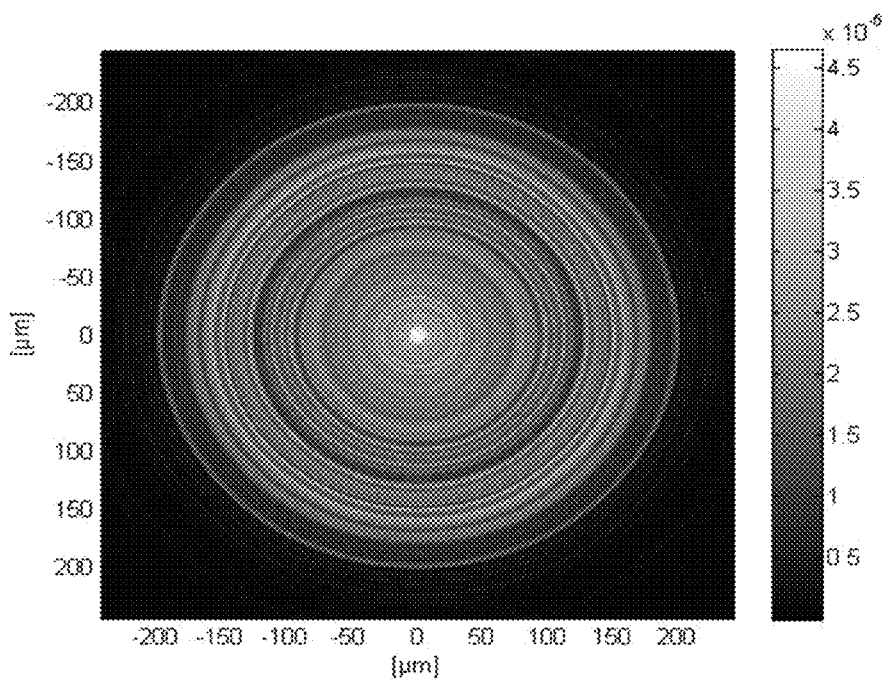
FIG. 7B is a schematic diagram illustrating the out-of-focus point spread function of the lens unit of FIG. 6A with birefringent device.

FIG. 7B shows the total out-of-focus PSF of the same lens unit in combination with a suitable circular symmetric birefringent device adapted to the lens unit. The birefringent device attenuates the ring-shaped side peak in the intensity distribution.

Figure 8:
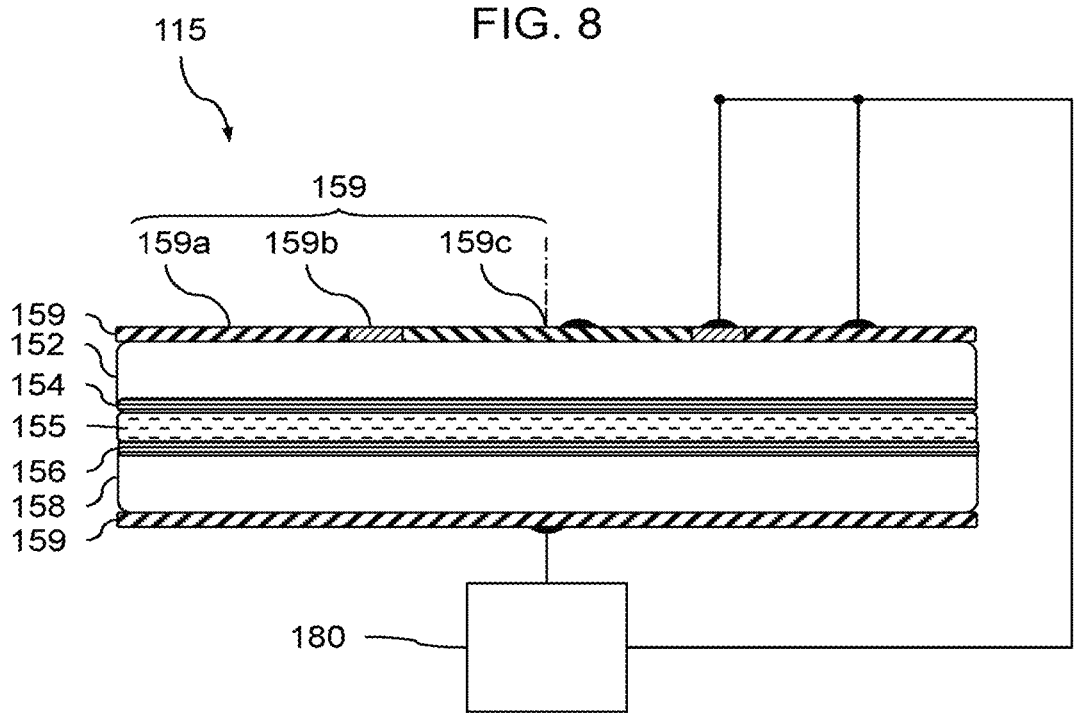
FIG. 8 is a schematic cross-sectional view of a controllable birefringent device according to a further embodiment.

FIG. 8 shows a birefringent device 115 including a liquid crystal layer 155 as birefringent element. The birefringent device 115 may further include two transparent carrier substrates 152, 158 arranged in parallel, wherein the liquid crystal layer 155 fills a gap between the two carrier substrates 152, 158. One or both of the carrier substrates 152, 158 may include an alignment layer 154, 156 that aligns the liquid crystal molecules in the liquid crystal layer 155 in a predefined alignment direction. The alignment direction may be position-dependent, for example may vary circularly symmetric to a centre point. The predefined alignment directions may define the phase function of the birefringent device 115 completely or may at least contribute to the definition of the phase function.

According to an embodiment, the alignment layers are based on polymers and the orientation pattern of at least one of the alignment layers 154, 156 may be fixed by linear photopolymerization. The liquid crystal layer 155 contains a liquid crystal and the orientation pattern of the liquid crystal is defined by the alignment layers. The birefringent device 115 may further include one or more transparent electrodes 159 arranged at least on one of the carrier substrates 152, 158.

A control unit 180 may be connected with the transparent electrodes 159 and may control the orientation of the crystal axes of the liquid crystal layer 155 by applying suitable voltages to the transparent electrodes 159 in response to a user action or a change of an internal state. For example, the user may turn on/off a switch at a camera housing or an internal processor for automated control may output a control signal in order to trigger the control unit 180 to change the phase function of the liquid crystal layer 155 from a first state to a second state and vice versa, wherein in the first state the liquid crystal attenuates the ring-shaped side peak in the out-of-focus point spread function of the lens unit by at least 25 percent and in the second state an effect of the liquid crystal on the out-of-focus point spread function is reduced with respect to the first state to degree perceivable by the user.

Separately controllable sections 159a, 159b, 159c of at least one of the transparent electrodes 159 may be assigned to different regions of the liquid crystal layer 155, for example to a circular region and one or more annular regions surrounding the circular region.

In accordance with an embodiment, the control unit 180 is configured to control the orientation of the crystal axes continuously such that the orientation of the complete liquid crystal layer 155 or a section of the liquid crystal layer 155 can be adjusted to an arbitrary angle between a minimum and a maximum value. According to another embodiment the control unit 180 controls the orientation in steps. For example, the liquid crystal layer 155 is a ferro-electric liquid crystal and the control unit 180 switches the orientation of the crystal axes of the liquid crystal layer 155 between a first orientation and a second orientation differing from the first orientation by, e.g., 90 degree.

For example, the control unit 180 may switch the orientation of the fast axis of the liquid crystal layer 155 out of a plane parallel to surfaces of the carrier substrates 152, 158 and/or parallel to the plane parallel to the surfaces of the carrier substrates 152, 158. For example, the liquid crystal layer 155 is a nematic liquid crystal in which the orientation of the fast axis in the liquid crystal layer 155 follows the electric field vector. As the electric field vector is perpendicular to the surfaces of the carrier substrates 152, 158, the crystal axis of the liquid crystal layer 155 will tilt out of the plane parallel to the surfaces of the carrier substrates 152, 158. As a result the effective refractive index for light passing the liquid crystal layer 155 will be decreased in case $n_e$ is greater $n_o$ or increased in case $n_o$ is greater $n_e$. A phase difference between the two linear Eigen polarization states will change accordingly. As a result, the applied voltage controls the phase function of the birefringent device 115.

The transparent electrodes may be divided into segments, wherein each segment can be driven by a separate voltage such that different phase patterns can be applied at a birefringent device 115. According to an embodiment, the voltage pattern can be adjusted for different modes. For example, one mode may show smooth defocus blur at costs of lower in-focus MTF and a second mode may exhibit high in-focus MTF but less smooth blur. A further mode may correspond to an off-state with almost no residual birefringence for perpendicular incident light beams such that the birefringent device 115 has no perceivable impact on the shape of both the in-focus PSF and the out-of-focus PSF.

Figure 9:
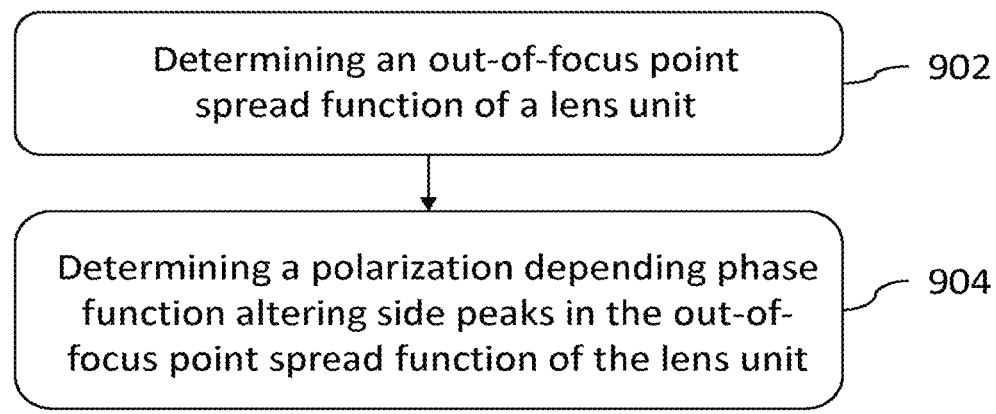
FIG. 9 is a simplified flowchart of a method of manufacturing a lens unit or an objective according to another embodiment.

FIG. 9 refers to a method of manufacturing an optical system. An out-of-focus point spread function of a lens unit with a plurality of lenses is determined, e.g., measured or derived from a virtual model of the lens unit (902). By using a numerical optimization method, a polarization dependent phase alteration for the pupil function is obtained that, when combined with the lens unit, attenuates the ring-shaped side peak in an intensity distribution of the out-of-focus point spread function by at least 25 percent. For minimizing the ring-shaped side peaks, the numerical optimization method varies two pupil functions with a complex conjugate portion, with minimum effect on an in-focus point spread function of the lens unit (904). A birefringent device may be manufactured that embodies a phase function obtained from the complex conjugate phase portion of the two pupil functions. The birefringent device may be mounted into the optical path of the optical system.

Note that the present technology can also be configured as described below.

(1) An optical system including:
    a lens unit including a plurality of lenses, wherein an out-of-focus point spread function of the lens unit includes an intensity distribution with a ring-shaped side peak at a radial distance to a center point; and
    a birefringent device in an optical path of the optical system, wherein the birefringent device is adapted to selectively attenuate the ring-shaped side peak in the out-of-focus point spread function of the lens unit.

(2) The optical system according to (1), wherein
    the pupil function of the lens unit is rotational symmetric with respect to the optical axis.

(3) The optical system according to (1) or (2), wherein
    the pupil function of the lens unit is circularly symmetric with respect to the optical axis.

(4) The optical system according to (1) to (3), wherein
    the pupil function of the optical system comprises a first pupil function assigned to a first polarization state and a second pupil function assigned to a second polarization state orthogonal to the first polarization state, and the first pupil function includes a phase portion which a is a complex conjugate of a phase portion included in the second pupil function.

(5) The optical system according to (1) to (4), wherein in the birefringent device an orientation of an ordinary axis and an orientation of an extraordinary axis change radially with respect to the optical axis of the optical system, respectively.

(6) The optical system according to (1) to (5), wherein the birefringent device comprises a circular inner zone and at least two annular zones surrounding the circular inner zone, respectively, wherein the circular inner zone and the neighboring annular zone as well as neighboring annular zones have different orientations of the ordinary and extraordinary axes of the birefringent material.

(7) The optical system according to (6), wherein a radius of the circular inner zone is at least half a radius of an effective area of the birefringent device.

(8) The optical system according to (6) or (7), wherein the birefringent device comprises at least ten annular zones.

(9) The optical system according to (6) to (8), wherein the orientation of an ordinary axis in an annular zone corresponds to the orientation of an extraordinary axis in a neighboring circular inner zone or annular zone.

(10) The optical system according to (1) to (9), wherein the birefringent device comprises a liquid crystal layer.

(11) The optical system according to (10) further including
a control unit configured to control the liquid crystal layer in response to a user input or an internal state, wherein in a first state a phase function of the liquid crystal layer is configured to attenuate the ring-shaped side peak in the intensity distribution of the out-of-focus point spread function of the lens unit and in a second state an effect of the liquid crystal layer on the out-of-focus point spread function is reduced with respect to the first state.

(12) The optical system according to (1) to (11), further including
the birefringent device comprises a first structure in which a refractive index effective for the first polarization state changes with increasing distance to the optical axis and a second structure in which a refractive index effective for the second polarization state changes with increasing distance to the optical axis.

(13) The optical system according to (1) to (12), wherein the birefringent device comprises a birefringent coating on an element of the lens unit.

(14) The optical system according to (1) to (13), wherein the birefringent device is adapted to attenuate the ring-shaped side peak in the out-of-focus point spread function of the lens unit by at least 25 percent.

(15) An interchangeable lens including:
a lens unit including a plurality of lenses, wherein an out-of-focus point spread function of the lens unit includes an intensity distribution with a ring-shaped side peak at a radial distance to a center point; and
a birefringent device in an optical path of the interchangeable lens, wherein the birefringent device is adapted to selectively attenuate the ring-shaped side peak in the out-of-focus point spread function of the lens unit.

(16) The interchangeable lens according to (15), wherein the birefringent device is adapted to attenuate the ring-shaped side peak in the out-of-focus point spread function of the lens unit by at least 25 percent.

(17) A camera, including:
a lens unit including a plurality of lenses, wherein an out-of-focus point spread function of the lens unit includes an intensity distribution with a ring-shaped side peak at a radial distance to a center point; and
a birefringent device in an optical path of the lens unit, wherein the birefringent device is adapted to selectively attenuate the ring-shaped side peak in the out-of-focus point spread function of the lens unit.

(18) The camera according to (17), wherein the birefringent device is adapted to attenuate the ring-shaped side peak in the out-of-focus point spread function of the lens unit by at least 25 percent.

(19) A method of manufacturing an optical system, the method including:
determining an out-of-focus point spread function of a lens unit that comprises a plurality of lenses, and
determining, by using a numerical optimization method, a polarization dependent phase alteration for the pupil function, the phase alteration attenuating a ring-shaped side peak in an intensity distribution of the out-of-focus point spread function of the lens unit by at least 25 percent when combined with the phase portion of the pupil function of the lens unit, the numerical optimization method varying two complex conjugate phase alterations in combination with the pupil function of the lens unit for minimizing the ring-shaped side peaks at minimum effect on an in-focus point spread function of the lens unit.

(20) The method according to (19), further including manufacturing a birefringent device embodying the two complex conjugate phase alterations.

(21) The method according to (20), further including mounting the birefringent device in the optical path of the optical system.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the disclosure, as well as other claims. The disclosure, including any readily discernible variants of the teachings herein, defines, in part, the scope of the foregoing claim terminology.

The present application claims priority to European Patent Application 15000940.5 filed by the European Patent Office on 31 Mar. 2015, the entire contents of which being incorporated herein by reference.

The invention claimed is:

1. An optical system comprising:
a lens unit comprising a plurality of lenses, wherein an out-of-focus point spread function of the lens unit includes an intensity distribution with a ring-shaped side peak at a radial distance to a center point; and
a birefringent device in an optical path of the optical system, wherein the birefringent device is adapted to selectively attenuate the ring-shaped side peak in the out-of-focus point spread function of the lens unit.

2. The optical system according to claim 1, wherein the pupil function of the lens unit is rotational symmetric with respect to the optical axis.

3. The optical system according to claim 1, wherein
the pupil function of the lens unit is circularly symmetric with respect to the optical axis.

4. The optical system according to claim 1, wherein
the pupil function of the optical system comprises a first pupil function assigned to a first polarization state and a second pupil function assigned to a second polarization state orthogonal to the first polarization state, and the phase portion of the first pupil function is a complex conjugate of the phase portion of the second pupil function.

5. The optical system according to claim 1, wherein
in the birefringent device an orientation of an ordinary axis and an orientation of an extraordinary axis change radially with respect to the optical axis of the optical system, respectively.

6. The optical system according to claim 1, wherein
the birefringent device comprises a circular inner zone and at least two annular zones surrounding the circular inner zone, respectively, wherein the circular inner zone and the neighboring annular zone as well as neighboring annular zones have different orientations of the ordinary and extraordinary axes of the birefringent material.

7. The optical system according to claim 6, wherein
a radius of the circular inner zone is at least half a radius of an effective area of the birefringent device.

8. The optical system according to claim 6, wherein
the birefringent device comprises at least ten annular zones.

9. The optical system according to claim 6, wherein
the orientation of an ordinary axis in an annular zone corresponds to the orientation of an extraordinary axis in a neighboring circular inner zone or annular zone.

10. The optical system according to claim 1, wherein
the birefringent device comprises a liquid crystal layer.

11. The optical system according to claim 10, further comprising
a control unit configured to control the liquid crystal layer in response to a user input or an internal state, wherein in a first state a phase function of the liquid crystal layer is configured to attenuate the ring-shaped side peak in the intensity distribution of the out-of-focus point spread function of the lens unit and in a second state an effect of the liquid crystal layer on the out-of-focus point spread function is reduced with respect to the first state.

12. The optical system according to claim 1, further comprising
the birefringent device comprises a first structure in which a refractive index effective for the first polarization state changes with increasing distance to the optical axis and a second structure in which a refractive index effective for the second polarization state changes with increasing distance to the optical axis.

13. The optical system according to claim 1, wherein
the birefringent device comprises a birefringent coating on an element of the lens unit.

14. The optical system according to claim 1, wherein
the birefringent device is adapted to attenuate the ring-shaped side peak in the out-of-focus point spread function of the lens unit by at least 25 percent.

15. An interchangeable lens comprising:
a lens unit comprising a plurality of lenses, wherein an out-of-focus point spread function of the lens unit includes an intensity distribution with a ring-shaped side peak at a radial distance to a center point;
a birefringent device in an optical path of the interchangeable lens, wherein the birefringent device is adapted to selectively attenuate the ring-shaped side peak in the out-of-focus point spread function of the lens unit.

16. The interchangeable lens according to claim 15, wherein
the birefringent device is adapted to attenuate the ring-shaped side peak in the out-of-focus point spread function of the lens unit by at least 25 percent.

17. A camera, comprising:
a lens unit comprising a plurality of lenses, wherein an out-of-focus point spread function of the lens unit includes an intensity distribution with a ring-shaped side peak at a radial distance to a center point; and
a birefringent device in an optical path of the lens unit, wherein the birefringent device is adapted to selectively attenuate the ring-shaped side peak in the out-of-focus point spread function of the lens unit.

18. The camera according to claim 17, wherein
the birefringent device is adapted to attenuate the ring-shaped side peak in the out-of-focus point spread function of the lens unit by at least 25 percent.

* * * * *